United States Patent
Halbin et al.

(10) Patent No.: US 7,721,613 B2
(45) Date of Patent: May 25, 2010

(54) METHOD OF MOUNTING A RETAINING RING ON AN ELECTRIC STARTER SHAFT COMPRISING A STARTER DRIVE ASSEMBLY AND CORRESPONDING STARTER

(75) Inventors: Philippe Halbin, Villefontaine (FR); Thierry Paltrie, Lyons (FR)

(73) Assignee: Valeo Equipements Electriques Moteur, Creteil (FR)

( * ) Notice: Subject to any disclaimer, the term of this patent is extended or adjusted under 35 U.S.C. 154(b) by 1190 days.

(21) Appl. No.: 10/542,820

(22) PCT Filed: Jan. 21, 2004

(86) PCT No.: PCT/FR2004/000130

§ 371 (c)(1), (2), (4) Date: Dec. 20, 2005

(87) PCT Pub. No.: WO2004/067950

PCT Pub. Date: Aug. 12, 2004

(65) Prior Publication Data

US 2006/0145481 A1 Jul. 6, 2006

(30) Foreign Application Priority Data

Jan. 21, 2003 (FR) .................... 03 00644

(51) Int. Cl.
*F02N 15/00* (2006.01)
*F02N 15/04* (2006.01)
*F02N 15/06* (2006.01)
*F02N 15/02* (2006.01)

(52) U.S. Cl. .................. 74/7 R; 74/6; 74/7 C; 74/7 A

(58) Field of Classification Search .............. 74/6, 74/7 A, 7 C, 7 R
See application file for complete search history.

(56) References Cited

U.S. PATENT DOCUMENTS

| | | | | |
|---|---|---|---|---|
| 1,811,401 A | * | 6/1931 | McGrath | .......................... 74/6 |
| 3,690,188 A | * | 9/1972 | McMillen | ...................... 74/7 R |
| 4,184,378 A | * | 1/1980 | Mazzorana | .................... 74/7 A |
| 4,464,576 A | * | 8/1984 | Williams | .................. 290/38 R |
| 5,953,955 A | | 9/1999 | Shiga et al. | |
| 6,169,333 B1 | | 1/2001 | Pentland et al. | |
| 6,237,432 B1 | | 5/2001 | Vilou | |
| 6,490,940 B1 | * | 12/2002 | Izquierdo et al. | .............. 74/7 E |

FOREIGN PATENT DOCUMENTS

| | | |
|---|---|---|
| EP | 0 494 681 A1 | 7/1992 |
| FR | 2 518 176 | 6/1983 |

(Continued)

*Primary Examiner*—Thomas R Hannon
*Assistant Examiner*—Justin Krause
(74) *Attorney, Agent, or Firm*—Osha • Liang LLP

(57) ABSTRACT

The invention relates to a method of mounting a retaining ring (21) on a rotating electric armature shaft. The inventive method consists in first mounting the retaining ring (21) on an axial shaft segment (27) which is located in an accessible mounting area between the groove (23) and the splines (15) of the starter drive assembly (10) and, subsequently, moving the starter drive assembly (10) axially towards the rest position such as to move the retaining ring (21) along the aforementioned shaft segment (27) as far as the positioning groove (23) comprising a service area with no radial access.

5 Claims, 4 Drawing Sheets

FOREIGN PATENT DOCUMENTS

| | | | |
|---|---|---|---|
| FR | 2 649 349 | | 1/1991 |
| GB | 667935 | * | 3/1952 |
| GB | 1 384 689 | | 2/1975 |
| JP | 61079525 A | | 4/1986 |
| JP | 64-39475 | | 3/1989 |
| JP | 4-56295 | | 5/1992 |
| JP | 5-6154 | | 1/1993 |

* cited by examiner

METHOD OF MOUNTING A RETAINING RING ON AN ELECTRIC STARTER SHAFT COMPRISING A STARTER DRIVE ASSEMBLY AND CORRESPONDING STARTER

TECHNICAL FIELD OF THE INVENTION

The invention relates to a method of mounting a retaining ring on a rotating electric starter shaft, comprising a starter drive assembly that includes a self-disengaging coupling device such as a freewheel unit cooperating with two series of helicoid splines of complementary shapes arranged respectively on the shaft and a bushing of a drive hub, which shaft has a first rear stop and a second front stop spaced apart on the shaft to define the course along which the starter drive assembly slides between the rest and working positions, said first rear stop being formed by said elastic retaining ring inserted into an annular positioning groove of the shaft.

STATUS OF TECHNOLOGY

FIGS. 1 and 2 show a starter drive assembly 10 of an electric starter, comprising a drive pinion gear 11 of the ring gear of an internal combustion engine, such as a motor vehicle. This starter drive assembly 10 also comprises a bushing 18, called carrier and a self-disengaging coupling device 12 which in this instance is a freewheel unit between the pinion gear 11 and the cylindrically shaped bushing 18. Two series 15, 16 of complementary shaped helicoid splines are provided. The freewheel transmission device 12 is axially inserted between the pinion gear 11 and a speed reducer 13 comprising an outer ring gear with internal teeth 13a and cooperating with satellite gears 14 supported on a satellite holder 14b. This speed reducer is coupled to the fluted end of the shaft of the electric motor as can be seen in FIG. 1 of the document WO 00/39454, to which reference can be made for more details, this reducer being of the type described in that document. The bushing 18 is integral with a cage 19 pertaining to the freewheel unit 12. A shaft 17 is coupled to the satellite holder 14b of the reducer 13a. This shaft 17 penetrates inside the bushing 18 and the pinion 11.

The two series of splines 15, 16 are arranged respectively on the shaft 17 and in the cylindrical bushing 18 of the starter drive assembly 17. The pinion 17 is thus inter-locked with the bushing 18 by the freewheel transmission device 12, which makes it possible to drive the pinion 11 during the normal starting phase, and to disengage the rotating mechanical drive connection when the speed of rotation of the pinion 11 exceeds that of the bushing 18. When the combustion engine has started, the presence of the freewheel device 12 prevents the pinion 11 engaged with the ring gear of the internal combustion engine from driving the rotor of the electric motor at an excessive speed that could damage said motor. Such a situation could occur when the operator of the vehicle does not cut off power from the switch immediately after starting.

The freewheel unit 12 illustrated in FIG. 1 is of the type with rollers 20 between a race of the cage 19 integral with the bushing 18 and an inner race attached to the pinion 11. However, it is clear that any other unidirectional transmission device can be used, particularly a self-disengaging cone clutch friction coupling device such as the one described in the document FR 2772433.

At the end of starting, the starter drive assembly 12 tends to unscrew from the splines 15 of the shaft 17, which causes an axial force tending to pull the end 25 of the bushing 18 toward a rear stop attached to the shaft 17, which stop is composed of a retaining ring 21 situated opposite the pinion 11. This axial reaction force is added to the retraction forces of the movable core of the electromagnetic contactor of conventional design, after power is cut off to said switch, by means of a lever (not shown) pivoting around an axis and one end of which is in contact with the movable core and the other free end is fitted in the groove 18a to drive the starter drive assembly in translation. Such an electromagnetic contactor and such a lever are described in the above-mentioned document WO 00/39454. The pinion 11 quickly escapes from the ring gear with enough speed to avoid wear and deterioration of the ends of the teeth.

A front stop 22 is arranged on the shaft 17 of the starter drive assembly to define the end-of-travel position of the pinion 11 when engaging on the ring gear. The axial interval separating the front stop 22 and the retaining ring 21 determines the course along which the starter drive assembly 12 slides between the rest and working positions, respectively, of the pinion 11.

The retaining ring 22 (FIG. 2) is open, shaped like a "C", with a thickness on the order of 1 to 1.5 mm. The separation between the end tips 24 of the C is slightly less than the diameter of the positioning groove 23 provided at the rear end of the shaft 17 of the starter drive assembly 10. In the rest position, the end 25 of the bushing 18 comes to a stop against the retaining ring 21.

The usual rules for mounting this type of circlips consist of exerting a radial thrust (arrow F, FIG. 1) on the middle part of the ring 21 to insert it in the positioning groove 23 in a direction perpendicular to the shaft 17. The pinching of the tips 24 after insertion allows the retaining ring 21 to be held stably in the groove 23.

Such a radial mounting of the retaining ring 21 of a known starter drive assembly is only possible if the positioning groove 23 is accessible vis-à-vis the protrusion 26 of the speed reducer 13. These protrusions 26 consist for example of elastic shock-absorbing bumpers 13b held in seats 50a of the housing 50 (partially shown) of the starter. These elastic means 13b therefore allow rotating movement which makes it possible to absorb the shocks and thus reduce the noise. For additional details, reference can be made to the document WO 00/39454. As a variation of embodiment, these protrusions 26 can be made of non-elastic bumpers.

The assembly composed of the pinion 11, the self-disengaging coupling device 12 and the speed reducer 13 is inserted, after placing the retaining ring 21 in its groove 23, into the housing 50 of the starter.

The shaft 17 of the starter drive assembly 10 should be axially lengthened a distance L to allow the insertion of the retaining ring 21. The result is an increase in the longitudinal size of the starter.

PURPOSE OF THE INVENTION

A purpose of the invention is to reduce these disadvantages, and to establish a mounting method to facilitate the insertion of the retaining ring of a starter drive assembly with stops on splines without the need to lengthen the shaft of the starter.

According to the invention, in a first step the retaining ring is first mounted on an axial segment of shaft in an accessible mounting area between the groove and the splines, and in a second step, the starter drive assembly is moved axially toward the rest position so as to move the retaining ring along the segment of shaft to the positioning groove, which is made in a service area with no radial access.

The retaining ring is inserted radially on the shaft in an area free of any surrounding parts, and a manual movement of the starter drive assembly then pushes the ring into the groove, set back where radial access would not be possible. Such mounting makes it possible to reduce the longitudinal size of the starter.

The invention also relates to an electric starter for a motor vehicle equipped with a starter drive assembly comprising a self-disengaging coupling device, such as a free-wheel unit cooperating with two series of helicoid splines of complementary shape made respectively on the shaft and in a bushing of a drive hub, a first rear stop and a second front stop spaced apart on the shaft to define the course along which the starter drive assembly slides between the rest and working positions, said first rear stop being formed by said elastic retaining ring inserted into an annular positioning groove of the shaft. The positioning groove is advantageously placed in a private service area with radial access, and below a protrusion from the speed reducer.

The device can be advantageously supplemented by one or more of the following features:

the positioning groove has a front face intended to axially block the retaining ring in the service area;

the positioning groove is delimited opposite the front face by an annular stop face, the width of which is greater than that of the front face;

the axial length of the groove separating the front face from the stop face is selected in order to seat one or more elastic retaining rings;

the positioning groove is axially separated from the splines of the shaft of the starter drive assembly by a conically shaped segment of shaft, the diameter of the side of the splines being less than the diameter near the front face of said groove.

SUMMARY DESCRIPTION OF THE DRAWINGS

Other advantages and characteristics will be seen more clearly from the following description of a mounting method according to the invention, given by way of non-limiting example, and represented in the attached drawings in which.

DESCRIPTION OF AN EXAMPLE OF EMBODIMENT ACCORDING TO THE INVENTION

Figure 1:
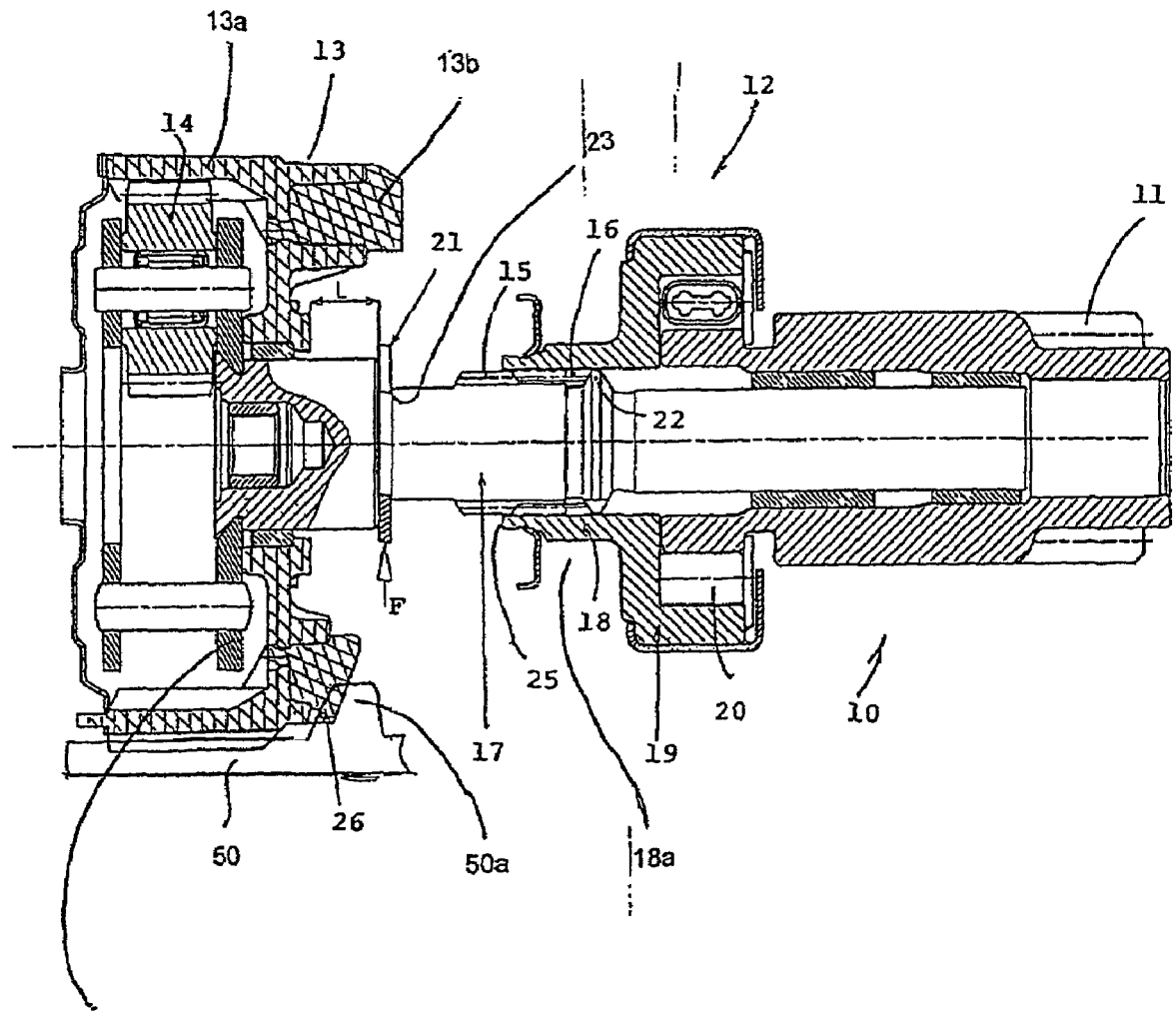
FIG. 1 shows a cross sectional view of the starter drive assembly of a starter of the prior art.
Figure 2:
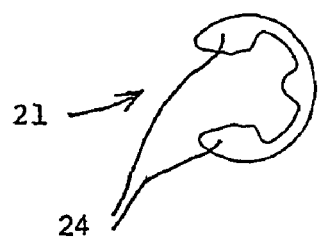
FIG. 2 is a detailed view of the retaining ring comprising the rear stop of the starter drive assembly shaft.
Figure 3:
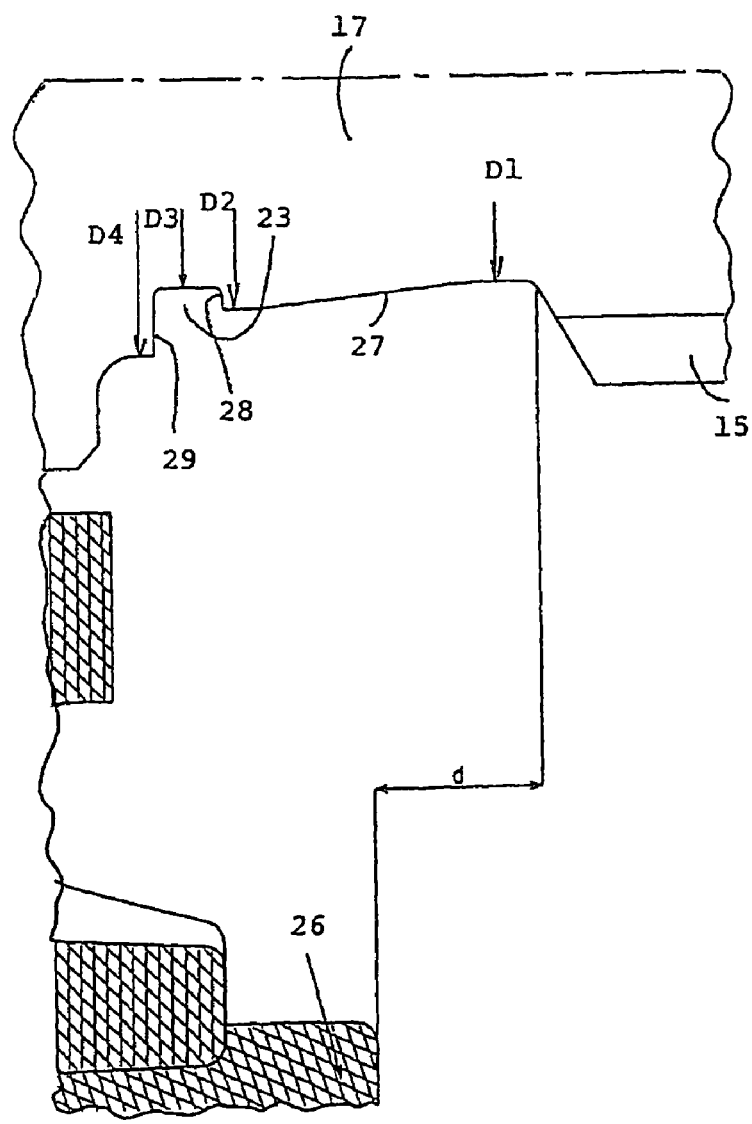
FIG. 3 is a diagrammatic half-view in cross section and in larger scale of part of the starter drive assembly shaft allowing the implementation of the mounting method according to the invention.
Figure 4:
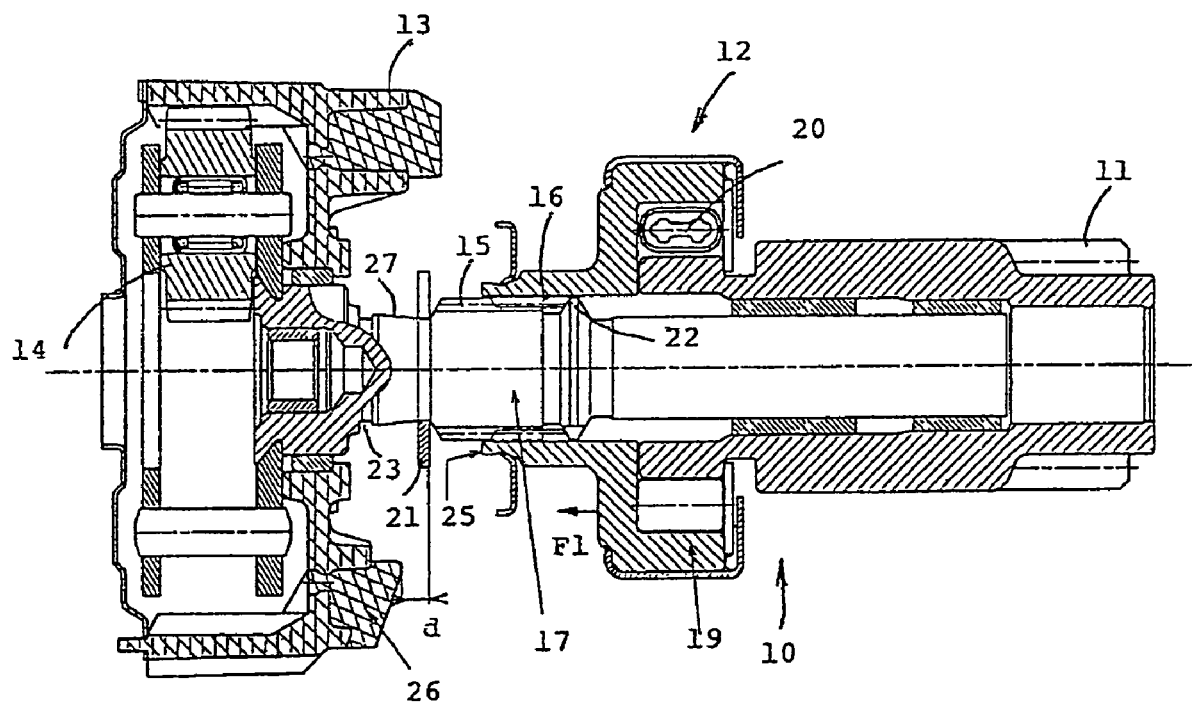
FIGS. 4 and 5 represent views identical to that of FIG. 1, illustrating the steps according to the invention of mounting the retaining ring, in the event of no access to the positioning groove according to FIG. 3.
Figure 5:
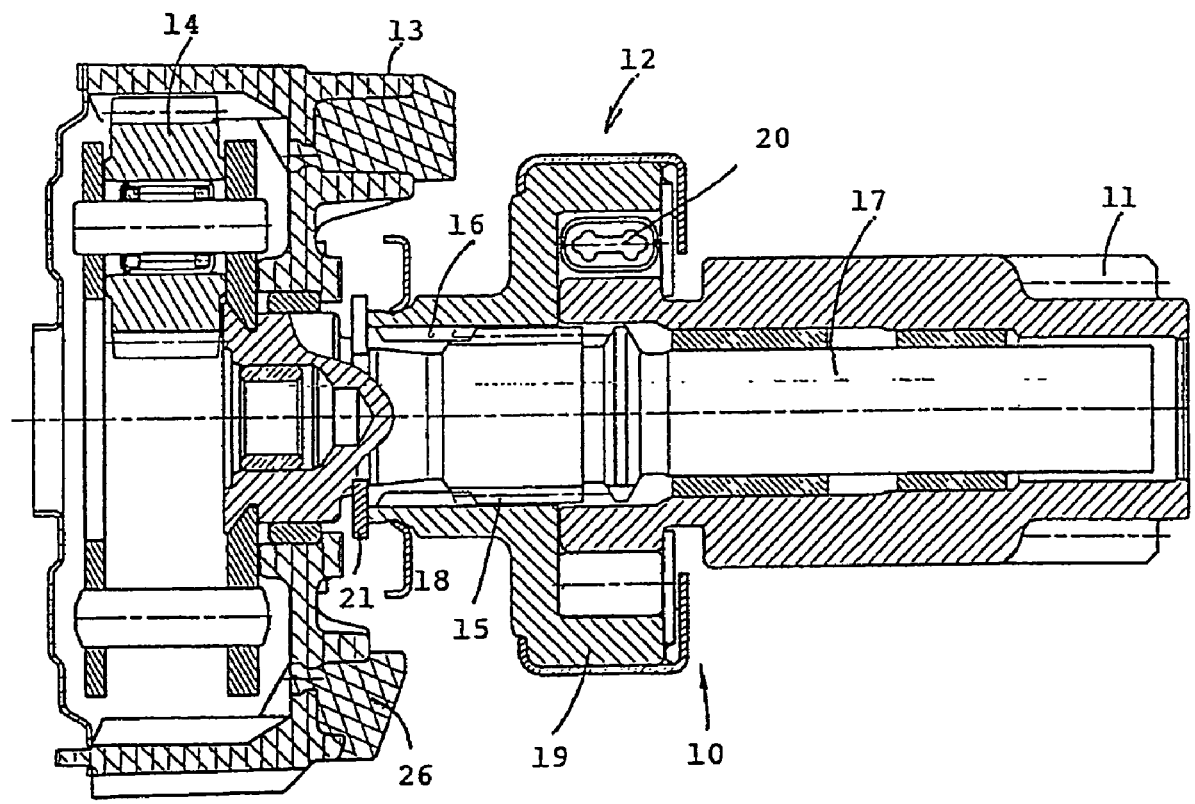

In FIGS. 3 to 5, the same reference numbers will be used to designate similar or identical parts to those in FIGS. 1 and 2.

With reference to FIG. 3, the positioning groove 23 of the shaft 17 of the starter drive assembly is axially separated from the inner splines 15 by a segment of shaft 27 with a progressive, such as conical, cross section. The diameter D1 of the shaft segment 27 of the side of the splines 15 is less than the diameter D2 near the front face 28 of the groove 23. The front face 28 is appreciably perpendicular to the longitudinal axis of the shaft 17, but can also be sloped and can have a non-rectilinear profile.

The diameter D1 of the shaft segment 27 is close to the diameter acceptable by the retaining ring without elastic deformation of said ring. Preferably, the diameter D1 is equal to the diameter D3 of the bottom of the groove 23 recommended by the manufacturer of the ring.

Opposite the front face 28, the groove 23 is delimited by an annular stop face 29, the width of which corresponds to the difference of the diameters D4 and D3. This width is sufficient to resist the axial thrust due to the return of the starter drive assembly to rest position, and is greater than the width of the front face 28 corresponding to the reference of diameters D2 and D3. Advantageously, the face 29 pertains to an increased thickness that the shaft 17 has for attaching it to the satellite holder 14b. This increased thickness is of a greater diameter than that of the segment 27.

The radial mounting area of the elastic retaining ring 21 is accomplished in a first step in the axial space d situated between the protrusion 26 and the end of the splines 15. This space d allows the insertion of the ring 21 on the accessible part of the shaft segment 27.

FIG. 4 illustrates this first step of inserting the retaining ring into the accessible space. The ring 21 is simply pushed radially onto the shaft segment 27, as in FIG. 1. The protrusion 26 does not hinder this mounting operation. Advantageously, as can be seen in FIGS. 4 and 5, the protrusions 26 do not all have the same shape. Some of these protrusions are shorter to reduce still more the axial length of the shaft 17 and to allow the easy mounting of the circlips.

To transfer the retaining ring 21 into the positioning groove 23 beneath the protrusion 26, the starter drive assembly 10 is moved in the direction of the arrow F1 so that the rear end 25 of the bushing 18 axially pushes the ring 21 along the shaft segment 27 toward the reducer 13 until engaging it in the positioning groove 23. It is thus possible to insert the retaining ring 21 in the positioning groove 23 located in a private service area with radial access, and without increasing the longitudinal size of the starter. As it moves along the shaft segment 27, the ring 21 opens progressively, then recloses when it falls into the groove 23.

Obviously, without going beyond the scope of the invention, the protrusions 26 can consist of any construction other than elastic bumpers (for example, made of elastomer) or of plastic intended to cooperate with the housing of the starter. For example, it could be a projection from the outer ring of the speed reducer. Protrusion should be understood as any device that prevents direct radial access to the groove 23 intended to seat the stop 21.

The invention claimed is:

1. A method of mounting a retaining ring on a rotating electric starter shaft of an electric starter drive assembly, wherein the electric starter drive assembly comprises:

a reducing gear coupled to the shaft and comprising a protuberance, wherein the starter drive assembly comprises:

a bushing and a pinion to drive a toothed ring of an internal combustion engine, and a self-disengaging coupling device acting between the bushing and the pinion and interposed axially between the reducing gear and the pinion, the busing and the shaft which penetrates inside the bushing having splines that cooperate, wherein the retaining ring is a rear stop arranged on the shaft, and wherein the shaft comprises a front stop, the front and rear stops being spaced apart thereon to define a course along which the starter drive assembly slides between a rest and a working position of the pinion, while being engaged on the toothed ring, an angular positioning channel provided on a rear end of the shaft for insertion of the retaining ring which forms the rear stop, wherein the electric starter drive assembly comprising the pinion, the self-disengaging coupling device, and the reducing gear is introduced in a housing of an electric starter, after the retaining ring is placed in the positioning channel, starting from a configuration in which the positioning channel is recessed from the protuberance of the reducing gear in a service area with no radial access, the method comprising:

mounting the retaining ring radially on an axial segment of the shaft with a progressive cross-section situated in a radial fitting area in an accessible mounting area between the positioning groove and the splines; and moving the starter drive assembly axially toward the rest position so as to move the retaining ring along the axial segment of the shaft to the positioning groove, which is located in a service area with no radial access.

2. The mounting method according to claim 1, wherein the service area is disposed beneath a protrusion of a speed reducer.

3. The mounting method according to claim 1, wherein a shaft segment with a cross section that increases toward the positioning groove is used.

4. The mounting method according to claim 3, wherein a diameter of the shaft is close or equal to a diameter acceptable by the retaining ring without elastic deformation of the retaining ring, wherein the diameter acceptable by the retaining ring is one that is less than or equal to a diameter of the positioning channel.

5. The mounting method according to claim 2, wherein the service area is disposed beneath a plurality of protrusions, wherein at least one protrusion is shorter than other protrusions of the plurality of protrusions.

* * * * *